3,039,231
EQUALIZING GLASS TEMPERATURE IN GATHERING AREA OF GLASS FURNACES
Herbert M. Augsburger, Sylvania, Ohio, and Harold R. Schutz, Fort Lauderdale, Fla., assignors to Owens-Illinois Glass Company, a corporation of Ohio
Filed Dec. 27, 1957, Ser. No. 705,518
2 Claims. (Cl. 49—77)

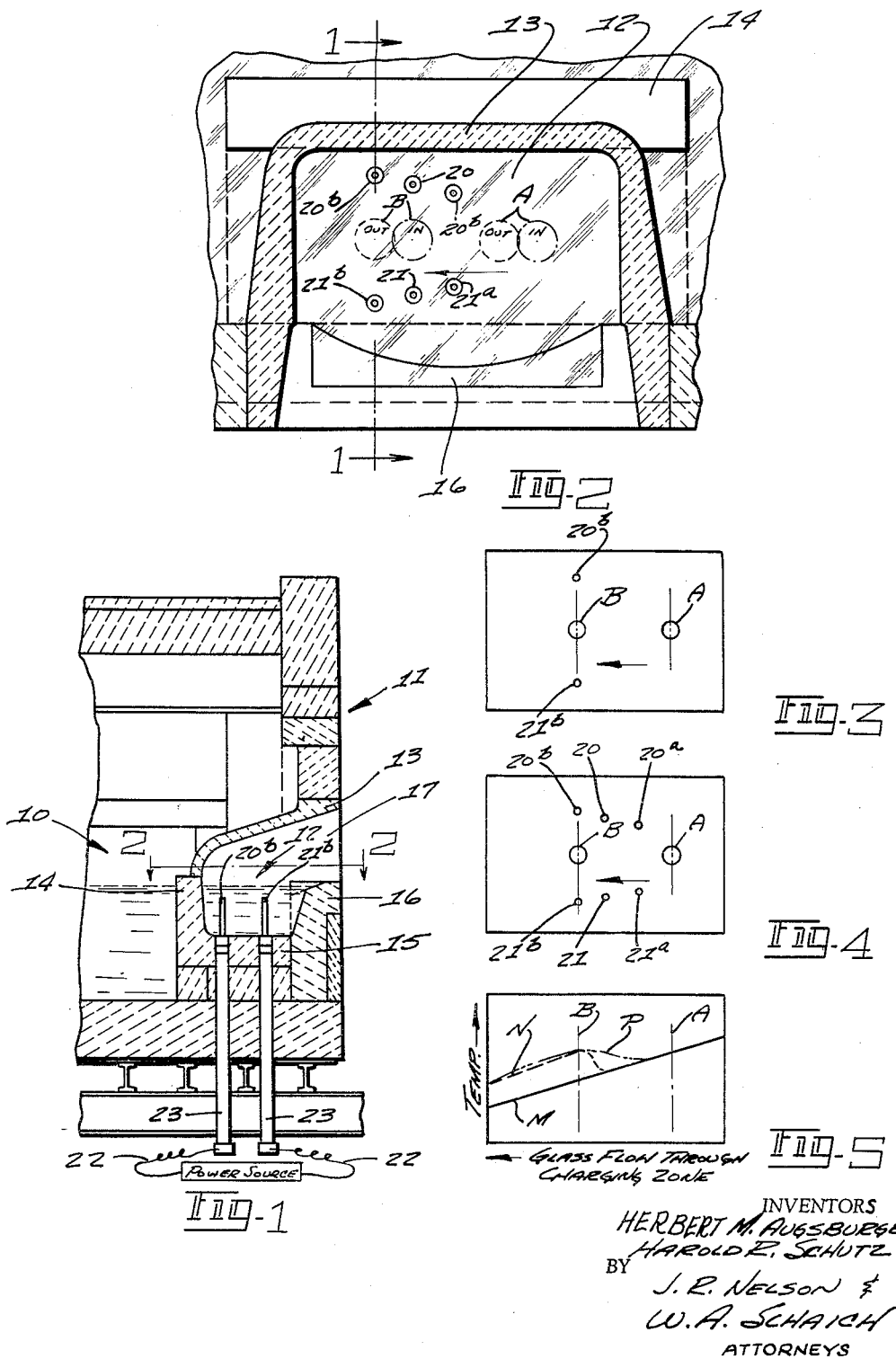

The present invention relates to conditioning glass for feeding by gathering and more particularly to equalizing the glass temperature at spaced gathering areas to improve the uniformity of the articles produced from the gathered charges or parisons.

The invention is primarily useful in a continuous furnace where glass batch is melted, refined and circulated through a forebay or forehearth section whereupon it is gathered and removed in the form of glass charges. The removal is accomplished, as herein illustrated, in a boot or gathering area of the forehearth by a reciprocating gathering ram carrying a pair of side-by-side molds at the outermost end thereof. The molds are carried in and out of the boot by inserting the ram through an archway opening. Upon entering the boot the molds are filled by dipping them in the glass in the gathering area, while a suction is being applied through the molds, then the dipped molds are usually swung horizontally through the glass, and retracted at a point other than their point of entry. The swinging movement, where practiced, is beneficial for eliminating contamination, whereby tails falling from the mold on removal will not fall at the defined points on the surface where the molds will re-enter on the next pass of the ram. Also, the swing provides a skimming action to clear the surface at the charging zone where the molds enter the glass.

The gathering ram is generally provided with a pair of spaced apart gathering molds. They enter the glass in the gathering area so that one mold is beside and downstream from the other. As the glass is circulating in a stream through the gathering area, a radiation heat loss occurs in the glass during flow so that a temperature differential exists in the glass between the upstream mold and the downstream mold on the gathering ram. It has been found that the temperature difference due to this heat loss that occurs, where normal feeding temperatures of the glass on the order of 2000°–2200° F. are used, is on the order of four degrees per inch between upstream and downstream points in the glass at the gathering points.

The present invention is directed to a means of compensating for this heat loss in the glass in that portion of the gathering area or boot where the gathering molds operate so that the molds are charged with glass of uniform temperature. By so doing, uniform parisons of the glass are obtained to enable production of articles therefrom having improved uniformity. This defined area of the boot through which a gathering mold is operated by the gathering ram to be in contact with the glass shall be referred to as a charging zone.

Accordingly, an important object of this invention resides in the provision of defined areas of glass as a charging zone wherein the temperature of the glass is controlled uniformly so that glass gathered therefrom is alike, homogeneous and uniform.

Another object of the invention is the provision of a method of equalizing glass temperatures at defined spaced apart gathering zones in the flowing stream of glass in a gathering area.

Another object of the invention is provision of electric heating means at the downstream gathering zone of defined separate gathering zones to effectively heat the glass thereat to equalized temperature with an upstream gathering zone.

Other objects and advantages of the invention will be apparent from the description hereinafter of the accompanying drawings.

On the drawings:

FIG. 1 is a sectional elevational view of a glass gathering area or boot in the forehearth section of a glass furnace and shows installation of the invention.

FIG. 2 is a sectional plan view, taken along lines 2—2 of FIG. 1.

FIG. 3 is a schematic view, showing a single pair of electrodes installed for heating glass at a downstream gathering zone.

FIG. 4 is a schematic view, showing the electrodes installed as in FIG. 2 at the same downstream gathering zone.

FIG. 5 is a chart plotting temperature change in the glass during flow through the gathering area, the curves shown being (1) temperature curve before applying the present invention, (2) temperature curve corresponding to the installation of the invention shown on FIG. 3, and (3) temperature curve corresponding to the installation of the invention shown on FIG. 2.

In FIG. 1, the forebay 10 of a melting furnace, designated generally at 11, receives refined molten glass from a refining chamber (not shown). The refined glass is continuously circulated through the forebay so that it passes through a gathering area or boot 12 located in the forward part of the forebay 10. A normal level of molten glass is constantly maintained in boot 12 for withdrawal. Boot 12 is constructed of refractory materials and includes an arch roof 13, back wall 14, bottom wall 15, and front wall 16. A vertical archway opening 17 is provided between the outer end of the arch roof 13 and front wall 16 for access to the glass in gathering area 12 from outside the furnace.

Glass is gathered from the boot 12 by a gathering ram device of the type shown and described in U.S. Patent No. 2,056,981 to A. C. Parker. During operation, a ram on this gathering ram device is inserted through the archway opening 17 and is provided with a pair of side-by-side molds at the outer end of the ram which enter the glass and gather a mold charge therefrom in a manner that will now be described under FIG. 2.

Glass is circulating through the boot 12 in a given direction, such as from right to left as indicated by the arrow on FIG. 2. The molds carried on the outer ends of the gathering ram are adapted to enter the glass at the defined location labeled "In." While the molds are submerged, the ram is shifted laterally to a location indicated "Out," whereupon the molds are withdrawn from the glass. During submersion, the molds are charged by applying a suction through them, which assures that the mold cavities are completely filled with glass during the just described stroke of the gathering ram.

As used herein, the term defined charging zone is intended to include that area in the glass in the boot 12 where the predetermined path of the ram inserts and withdraws the molds. This may be over an area greater than the area of the molds or may coincide substantially with the mold cross-sectional area, obviously depending upon whether the stroke of the ram includes lateral movement after the molds contact the glass.

As seen on FIG. 2, the molds enter the glass in boot 12 in spaced apart relationship longitudinally to the glass flow stream so that one of the molds is upstream from the other. During the aforementioned gathering stroke of the ram, the gathering molds shift longitudinally in the glass along the glass flow stream through boot 12. Due to the exposure of the glass to the outside through the archway opening 17, the glass at the downstream mold charging zone B is at a lower temperature than at the upstream mold charging zone A. Referring briefly to FIG. 5, the temperature gradient is shown as a solid line M. This variation in temperature between the two charging zones A and B will result in production of ware having different weight from the gathered glass having different viscosities and temperatures. It has been found that a more uniform weight may be produced by gathering glass of like viscosity and temperature in the blank mold charges. Consequently, the need arises to equalize the temperatures in the glass for the charging zones A and B so that the gathered charges will have like temperature and viscosity.

One of the forms of the invention for equalizing glass temperature at these spaced charging zones is illustrated schematically in FIG. 3. Basically, this amounts to inserting a pair of electrodes 20 and 21 through the bottom wall 15 of the furnace (FIG. 1) so that they are submerged in the glass in boot 12 and located transversely of the glass flow stream at the charging zone B for the molds. Electrodes 20 and 21 are then connected onto a power circuit 22 which includes an electrical power source. Temperature of the glass may then be controlled by regulating the current flow through the glass between the electrodes 20 and 21. The vertical location of the electrodes 20 and 21 with relation to the surface of the glass in boot 12 may be adjusted by the provision of electrode mountings 23 respectively for said electrodes which provide for adjustable shifting electrodes in these mountings inserted through the bottom wall of the boot 12.

Referring again to FIG. 5, the current flow between electrodes 20 and 21 of FIG. 3 may be adjusted to produce a temperature gradient curve indicated as N. It is seen from curve N that the temperature level as charging zone B is then equal to that of charging zone A.

Although one pair of electrodes will accomplish the purpose of the invention as described for FIG. 3 and illustrated on the temperature curve N of FIG. 5, a preferred arrangement for the invention is the provision of multiple pairs of electrodes, such as three pairs of electrodes 20—21, 20a—21a, and 20b—21b, which are respectively spaced transversely of the direction of glass flow proximate to the downstream charging zone B. It is very difficult and practically impossible to predetermine initially the correct location of the pair of electrodes or to move the location of these electrodes during operation. The electrode pairs may, therefore, be arranged at installation so that when connected to a power circuit, the heating effect at the charging zone B may be shifted laterally in the zone. This may be done by installing multiple electrodes, as shown on FIG. 3, and using various combinations of the electrode pairs to shift laterally the location of the current path. The peak of the temperature curve, shown on the dashed lines in the chart of FIGURE 5, may thereby be adjusted to the location B. The pairs of electrodes are shown as arranged in divergent manner so as to allow closer lateral spacing of them in zone B. Since the gather of the glass of the mold is from the charging zones or definite areas, the temperature of the glass on the downstream of the gather is normally lower than on the upstream thereof. For exceptionally fine control and distribution of the glass in the gather, it is desirable that the entire gathering stroke of the ram operating in glass have uniform temperature. It is possible to obtain the desired uniformity of temperature at the downstream charging zone by the proper location of a pair of electrodes. By installing multiple electrodes as shown on FIGS. 2 and 4, the pairs may be connected onto a power circuit so that various combinations of electrodes, such as 20—21, 20a—21a, or 20b—21b may be used to laterally shift the location of the current path at the charging zone B to relocate the peak of the temperature curve N (FIG. 5) so as to coincide with the location B. Alternatively, the temperature curve may be flattened at its peak portion, such as curve P of FIG. 5, by multiple connection of the aforementioned pairs of electrodes. This latter mentioned technique of multiple current paths between the electrodes will give a wider latitude in the uniform temperature operating area of the downstream charging zone and will permit a longer lateral stroke of the gathering ram.

It should be understood that it is not essential that the path of current flow between pairs of electrodes be at exactly 90° to the glass flow stream. In fact, it has been found in practicing the invention that the current paths between electrodes are not in a straight line but rather are more nearly looped paths. To compensate for this occurrence, the location of the electrodes may be shifted slightly upstream or downstream from the intersecting plane of the charging zone where heat is desired.

With respect to the foregoing, it also should be obvious that an angle of less than 90° transversely of the said stream from the downstream side may be desirable due to lower temperature of glass on the outer side of the forebay nearest archway opening 17, since this side has greater radiation losses.

Various other modifications and/or electrode arrangements may be resorted to without departing from the principles of the invention, and it is therefore not intended that the patent granted hereon shall be limited otherwise than necessitated by the scope of the following claims.

We claim:

1. The method of gathering charges of molten glass into a pair of side-by-side blank molds constructed and arranged for carriage into, through and out of the glass by a ram, comprising flowing molten glass through a channel, inserting said blank molds simultaneously into the glass in said channel at a pair of respectively longitudinally spaced gathering areas defined by the spacing between the said pair of molds on the ram and operation thereof during charging the molds with glass, one of the gathering areas being upstream in the glass from the other gathering area, passing a plurality of electric currents through the glass in and adjacent to the said other gathering area, said currents being impressed in the glass in a plurality of variable length parallel paths disposed substantially transversely to the direction of flow of the glass, said paths being spaced from each other in a downstream direction, and separately controlling the heating effect of each of said currents being impressed, whereby the heating effect among the said plurality of current paths is progressively increased according to their disposition in the downstream direction to equalize the temperature of the glass at said other gathering area to that at said upstream gathering area.

2. The method of gathering charges of molten glass into a pair of side-by-side blank molds constructed and arranged for carriage into, through and out of the glass by a ram, comprising flowing molten glass through a channel, inserting said blank molds simultaneously into the glass in said channel at corresponding first and second gathering areas spaced apart horizontally, said first gathering area being upstream in the glass from said second gathering area, passing electric current through the glass in the second gathering area and substantially transversely to the path of the glass flowing therethrough, and controlling the heating effect of said current to increase the temperature of the glass being gathered in the second gathering area sufficient to equalize it with the temperature of the glass being gathered in the first gathering area.

References Cited in the file of this patent

UNITED STATES PATENTS

| | | |
|---|---|---|
| 1,438,402 | Rule | Dec. 12, 1922 |
| 1,867,440 | Bridges | July 12, 1932 |
| 1,897,973 | Wadman | Feb. 14, 1933 |
| 1,999,744 | Wadman | Apr. 30, 1935 |
| 2,056,981 | Parker | Oct. 13, 1936 |
| 2,150,637 | Schutz | Mar. 14, 1939 |
| 2,179,224 | Soubier | Nov. 7, 1939 |